United States Patent [19]

Dobrokhtova et al.

[11] 4,368,318

[45] Jan. 11, 1983

[54] PREPARATION OF DODECALACTAM POLYMERS WHEREIN MOLTEN MONOMER IS FILTERED PRIOR TO POLYMERIZATION

[76] Inventors: Marina K. Dobrokhtova, Dubininskaya ulitsa, 6, kv. 93; Bladimir A. Evseev, Kupavinsky Proezd, 4-32; Evgeny S. Artsis, Samotechnaya ulitsa, 17-A-79; Gennady A. Enenshtein, ulitsa Chernyshevskogo, 25, kv. 9; Boris P. Cheburashko, Kashirskoe shosse, 92-3-424; Maria G. Platoshkina, Dorozhnaya ulitsa, 28-1-145, all of Moscow; Vladimir P. Nefedov, ulitsa Ijulskaya, 48-27, Sverdlovsk; Ljudmila I. Valyshkina, Ryazansky prospekt, 60-141, Moscow, all of U.S.S.R.

[21] Appl. No.: 184,423

[22] Filed: Sep. 5, 1980

[51] Int. Cl.³ .............................................. C08G 69/16
[52] U.S. Cl. .................................... 528/326; 528/313; 528/323; 528/324; 528/325

[58] Field of Search ................................ 528/326, 323

[56] References Cited

U.S. PATENT DOCUMENTS 3,317,482  5/1967  Kunde et al. ...................... 528/326
4,077,946  3/1978  Enenshtein et al. ................ 528/326

*Primary Examiner*—Harold D. Anderson
*Attorney, Agent, or Firm*—Robert E. Burns; Emmanuel J. Lobato; Bruce L. Adams

[57] ABSTRACT

The method for preparing polydodecanamide or copolymers based thereon according to the present invention involves melting of ω-dodecalactam or a mixture thereof with amide-forming monomers and polymerization of the resulting melt at a temperature ranging from 180° to 320° C. in the presence of a catalyst and a molecular-mass regulator. According to the invention, prior to polymerization the resulting melt is filtered through a filtering bed comprising solid oxidized particles of ω-dodecalactam with an elemental content of oxygen of from 10 to 24% by mass.

7 Claims, No Drawings

PREPARATION OF DODECALACTAM POLYMERS WHEREIN MOLTEN MONOMER IS FILTERED PRIOR TO POLYMERIZATION

The present invention relates to the production of plastics and, more specifically, to a method for the preparation of polydodecanamide (polyamide-12) and copolymers based thereon.

FIELD OF THE INVENTION

Polymers produced by the method according to the present invention will find a wide application in the manufacture of various articles by methods of injection-moulding or extrusion and intended for use in car-manufacture, instrument-making, electrical engineering, aviation engineering, medicine, sports, etc.

BACKGROUND OF THE INVENTION

Methods for preparing polyamide-12 are known in the art, wherein polymerization of ω-dodecalactam is effected at a temperature within the range of from 180° to 330° C. in the presence of different catalysts and molecular-mass regulators (cf. French Pat. No. 1,401,842 Cl. C08 g, 1965; French Pat. No. 2,262,680, Cl. C 08 G, 1975; French Pat. No. 1,495,816 Cl. C 08 g, 1967; British patent application No. 1,345,567 Cl. C 08 g 20.18, 1974; U.S. Pat. No. 3,799,899 Cl. 260-78, 1978; U.S.S.R. Inventor's Certificate No. 614,120 Cl. C 08 G 69/16, Bulletin of Inventions Industrial Designs and Trademarks, No.25, 1978; British Application No. 1,402,567 Cl. C 08 68/18, 1975).

It is known that in the synthesis of polyamides, in particular, polycaproamide (polyamide-6) great attention is paid to filtration of the monomer melt to make it free from contamination (G. Klare, E. Fritzsche, F. Groebe "Synthetic Polyamide Fibres", "Mir" Publishers, Moscow, 1966, p. 101; G. Kudryaevtsev, M. Nosov, A. Volokhina, "Polyamide Fibres," Khimija Publishing House, Moscow, 1976, p.81). Various filter apparatus and filter fabrics are recommended for this purpose (cf. K. Fishman, N. Khruzin, "Manufacture of Kapron Fibre," Moscow, "Khimiya" Publishers, 1976, p. 48; L. Volf, B. Haitin, "Manufacture of Polycaproamide," Moscow, "Khimiya" Publishers, 1977, p. 68 and 81).

In the literature there are examples illustrating the use of disintegrated polyamide fibers as a filtering aid for a built-up filtering bed (cf. U.S. Pat. No. 3,880,754 Cl. 210-75, 1975; FRG Pat. No. 2,111,855 Cl. B01 D 39/04, 1976). However, these materials which are suitable for filtering a melt of caprolactam (at a temperature of from 100° to 120° C.) turn to be inapplicable for the filtration of a melt of ω-dodecalactam due to the necessity of applying a higher temperature. The use of filtering materials at a temperature within the range of from 200° to 250° C. has been disclosed in the literature.

At such temperatures, use can be made of, for example, a zeolite filtering partition (cf. Japanese Pat. No. 49-43198, Cl. 72 C 340.1, 1974). However, the procedure for partition manufacture is very complicated and necessitates the use of rather cumbersome equipment for its manufacture and use. The same disadvantages are inherent in metal-ceramic filters (cf. British patent application No. 1,313,795 Cl.B 01 D 39/10, 1973; U.S. Pat. No. 3,746,642; Cl. 210-46, 1974; French Pat. No. 2,252,865 Cl. B 01 D 39/06, 1975).and filtering blocks made of metal screens (cf. U.S. Pat. No. 3,679,057 Cl. 210-223, 1972). Furthermore, for the manufacture of metal-ceramic filters there are consumed up to 30–40% of alloying dopes, thus causing an essential increase in the production costs of the filtering materials. A method is known in the art for producing polyamide which comprises the following operations.

A mixture of the starting reagents, i.e.: dodecalactam melt, water, a catalyst and a molecular-mass regulator are supplied into the reactor by means of a metering device; in the reactor the first stage of polymerization is conducted at a temperature within the range of from 270° to 320° C. under a pressure of from 60 to 120 atm. Then the partly reacted mixture is fed into a throttling device, wherein evaporation of water occurs and the water is withdrawn from the process as steam.

Then the melt is throttled to a lower pressure and fed into the second reactor to the stage of polymerization, wherein a further build-up of the molecular mass occurs and the residual water is distilled-off under vacuum. The final polymer is discharged from the second reactor (cf. U.S.S.R. Inventor's Certificate No. 614,120 Cl. C 08 G 69/16).

This process features the disadvantage residing in that upon melting and accumulation of the melt of the starting ω-dodecalactam prior to metering thereof into the reactor, contact inevitably takes place between ω-dodecalactam and oxygen, despite all the measures taken to avoid it. Thus, there is used sealed equipment, continuous purging of the system and keeping an overatmospheric pressure therein by means of nitrogen containing less than 0.001% of oxygen. As a result of the contact with the residual oxygen at a temperature within the range of from 180° to 250° C. a certain portion of ω-dodecalactam is oxidized to give a substance which, while taking part in the polymerization, contaminates the final product; it is present in the form of minor inclusions of black colour which impair physico-chemical properties of the material.

Thus, prior to polymerization the amount of impurities in the melt of ω-dodecalactam is as high as 103 g/ton of the monomer.

To purify the polymer from contaminants, it should be subjected to manual sorting thus causing increased losses of the product and additional labour consumption.

SUMMARY OF THE INVENTION

It is an object of the present invention to increase the desired product yield simultaneously with improving physico-mechanical characteristics thereof.

This object is accomplished by the method of preparing polydodecanamide or copolymers based thereon, comprising melting of ω-dodecalactam or a mixture thereof with amide-forming monomers, followed by polymerization of the resulting melt at a temperature within the range of from 180° to 320° C. in the presence of a catalyst and molecular-mass regulator, wherein according to the present invention prior to polymerization the resulting melt is filtered through a bed consisting of solid oxidized particles of ω-dodecalactam with an elemental content of oxygen ranging from 10 to 24% by mass.

The method according to the present invention provides for a higher yield of polydodecanamide or copolymers based thereon simultaneously with improving its mechanical strength and elastic properties.

DETAILED DESCRIPTION OF THE INVENTION

Crystalline ω-dodecalactam is charged into an apparatus and melted in a current of nitrogen at a temperature within the range of from 180° to 240° C. Thereafter the resulting melt is subjected to filtration through a bed comprising solid oxidized particles of ω-dodecalactam with an elemental content of oxygen of from 10 to 24% by mass. The purified monomer melt is fed into a reactor, wherein polymerization occurs at a temperature of from 180° to 320° C. in the presence of catalysts and molecular-mass regulators.

Polymerization can be effected by hydrolytic, anionic and cationic methods under continuous or batch-wise conditions.

Furthermore, for the production of various compositions on the basis of polydodecanamide in the polymerization process, it is possible to introduce into the reaction mixture known fillers such as talc, glass fiber, titanium dioxide, alumina, graphite and the like.

The resulting polymer melt is discharged from the reactor as a continuous jet which is water-cooled and cut into pellets. Preparation of copolymers based on polydodecanamide is effected in a similar manner.

In the method according to the present invention the filtering layer comprises ω-dodecalactam subjected to a heat-treatment at a temperature within the range of from 100° to 250° C. in the presence of oxygen.

After such treatment ω-dodecalactam is converted into the oxidized form. As a result, its melting point is substantially increased (above 330° C.), particle size of solid pellets is changed and the ability of being dissolved in standard solvents is lost. The thus-prepared modified product consists, as has been shown by microscopic analysis, of needle-like and horseshoe-like particles of an irregular shape with a dimension of the elongated portion of from 1 to 10 μm having a dark colour. The bed of such particles possesses a lowered resistance to the melt passage therethrough and a satisfactory retaining ability relative to the formed impurities in the polymer melt.

For the preparation of the filtering bed, use can be made of conventional apparatus such as an apparatus with a stirrer, bubbling-type apparatus and the like, whereinto ω-dodecalactam is charged, melted at a temperature of from 153° to 250° C. and treated by air or a mixture of oxygen with nitrogen to give the required suspension of oxidized ω-dodecalactam in the melt of ω-dodecalactam. The thus-produced suspension is fed to a heated filter to wash-up the filtering bed.

For the preparation of the filtering bed, use can be made of crystalline ω-dodecalactam which is treated at a temperature of from 100° to 153° C. with a mixture of oxygen and nitrogen, followed by melting and delivering the suspension to a filter for washing-up the filtering bed.

The filtering bed as used in the method according to the present invention possesses an increased melting point (above 330° C.) and good filtering characteristics, thus enabling a high degree of purification of the monomer melt and synthesis of the polymer without impurities impairing its properties. Furthermore, a preliminary filtration with the use of the bed according to the present invention minimizes manual operations for sorting of the granulated polymer and cleaning of the equipment and ensures the formation of a continuous jet upon discharging of the melt from the reactor.

For the purpose of comparison, in Table 1 there are given characteristics of the method according to the present invention and the prior art method according to U.S.S.R. Inventor's Certificate No. 614120.

TABLE 1

| Characteristics | Method of the invention | Prior art method |
|---|---|---|
| 1. Rate of consumption of -dodecalactam per ton of the polymer | 1.010 | 1.030 |
| 2. Number of planned shutdowns of the equipment for cleaning per year | 1 | 4 |
| 3. Amount of impurities separated from the melt of -dodecalactam prior to polymerization, g/t of the product | 103 | — |

As follows from the data of the above Table 1, the process according to the present invention makes it possible to increase the purity of polyamide-12, increase the yield thereof and improve the process scheme, namely: reduce the number of labour-consuming steps associated with sorting of the final product, cleaning of the reactor and filters; reduce labour consumption and increase the product output from the production unit.

For a better understanding of the present invention, some specific examples are given hereinbelow.

EXAMPLE 1

Into a 80 l apparatus provided with electric heating there is charged crystalline ω-dodecalactam which is subjected to melting. Then air is supplied into the apparatus at the temperature of 180° C. with stirring. The resulting suspension of oxidized ω-dodecalactam in the melt of ω-dodecalactam is fed into a second heated apparatus with the capacity of 4 filters, wherein a stainless metal screen is provided with a surface area of 0.05 $m^2$ fixed on a perforated sleeve. The washing-up of the filtering bed on the screen takes place for 5 hours; the element content of oxygen in the bed being equal to 24.0% by mass.

Then through the filtering bed a portion of the melt of ω-dodecalactam is filtered in the amount of 45 kg to be delivered into the reactor. Into the reactor there are charged 1.6 kg of distilled water, 0.08 kg of orthophosphoric acid, 0.13 kg of adipic acid and polymerization occurs at the temperature of 280° C. On completion of the polymerization, the polymer melt is continuously discharged through a spinneret, cooled in a bath to the temperature of 30° C. and granulated. In the following Table 2 there are given comparative physico-chemical characteristics of samples of polyamide-12 produced as in Example 1 and according to U.S.S.R. Inventor's Certificate No. 614120.

TABLE 2

| Characteristics | According to USSR Inventor's Certificate No. 614120 | According to Example 1 |
|---|---|---|
| 1. Specific viscosity of 0.5% solution on polymer in cresol at 25° C. | 0.66 | 0.68 |
| 2. Melting point, °C. | 179 | 179 |
| 3. Breaking tensile strength, kgf/$cm^2$ | 509 | 564 |
| 4. Bending strength at flexure of 1.5 thick- | | |

TABLE 2-continued

| Characteristics | According to USSR Inventor's Certificate No. 614120 | According to Example 1 |
| --- | --- | --- |
| ness of the sample, kgf/cm² | 390 | 450 |
| 5. Resilience of the notched sample at 20 ± 2° C., kgf.cm/cm² | 4.5 | 6.8 |
| 6. Relative elongation, % | 238 | 284 |
| 7. Softening temperature at the bending stress of 18.5 kgf/cm², °C. | 43 | 45 |

EXAMPLE 2

Into a 80 l apparatus provided with electric heating crystalline ω-dodecalactam is charged and melted. Then at the temperature of 200° C. under running stirrer a mixture of oxygen and nitrogen containing 1 vol.% of oxygen is charged. The resulting suspension of oxidized ω-dodecalactam is fed into another heated apparatus with the capacity of 4 liters, wherein a metal stainless screen is mounted having surface area of 0.05 m² mounted over a perforated sleeve. The filtering bed is washed-up on the screen for 5 hours, the elemental content of oxygen in the bed being equal to 15.6% by mass.

Then through the filtering bed a portion of the melt of ω-dodecalactam is filtered in the amount of 37 kg which is delivered into a reactor-polymerizer. Then into the reactor talc is charged as a filler in the amount of 3.7 kg, a catalyst—orthophosphoric acid—in the amount of 0.18 kg and distilled water in the amount of 1.6 kg.

The polymerization is conducted at the temperature of 300° C. On completion of the polymerization, the polymer melt is continuously drained through a spinneret, cooled in a bath to a temperature of from 60° to 80° C. and granulated. In the following Table 3 there are shown physico-mechanical characteristics of talc-filled polyamide-12.

TABLE 3

| Characteristics | |
| --- | --- |
| 1. Specific viscosity of 0.5% solution of polymer in cresol at 25° C. | 0.76 |
| 2. Melting point, °C. | 179 |
| 3. Resilience of a notched sample at 20 ± 2° C., kgf/cm/cm² | 5.5 |
| 4. Bending stress at flexible of 1.5 thickness of the sample, kgf/cm² | 540 |

EXAMPLE 3

Into a 80 l apparatus provided with electric heating crystalline ω-dodecalactam is charged and melted. Then at the temperature of 240° C., while operating the stirrer, a mixture of oxygen and nitrogen containing 0.1 vol.% of oxygen is charged thereinto. The resulting suspension of oxidized ω-dodecalactam in the melted ω-dodecalactam is delivered into a 4 l heated filter, wherein a metal stainless screen having the surface area of 0.05 m² is mounted on a perforated sleeve. The filtering bed with the elemental content of oxygen of 10% by mass is washed-up on the screen for 5 hours.

Then a portion of the melt of ω-dodecalactam is filtered through the filter and delivered into the reactor-polymerizer in the amount of 15 kg. Also charged into the reactor are 15 g of ε-caprolactam, 15 kg of hexamethylenediammonium adipate, 1.6 kg of distilled water; 0.09 kg of orthophosphoric acid and at the temperature of 280° C. polymerization is effected. On completion of the polymerization the polymer melt is continuously passed through a spinneret, cooled in a bath to a temperature of from 30° to 50° C. and granulated. The resulting polyamide-12 has the following characteristics: specific viscosity 0.6, melting point 133° C., breaking tensile strength 390 kgf/cm², relative elongation at rupture 378%.

EXAMPLE 4

The filtering bed is prepared following the procedure described in Example 1 hereinbefore. Thereafter, through the filtering bed a portion of the melt of ω-dodecalactam is filtered and delivered to the reactor-polymerizer at the temperature of 180° C. in the amount of 7.75 kg. Also charged into the reactor is sodium salt of caprolactam preliminarily prepared in the proportions of 0.25 kg of caprolactam and 0.0048 kg of metallic sodium and the stirrer is switched on. Then the melt of the thus-prepared mixture is cast into a mould preheated in a furnace to the temperature of 180° C., added with 0.0032 g of an activator—acetylcaprolactam—and polymerization is carried out at the temperature of 180° C. Then the mould is slowly cooled and the polymer is extracted therefrom as a single block. The thus-produced polyamide has the following characteristics: melting point 177° C., yield tensile point 530 kgf/cm²; relative elongation at rupture 169%; bending stress 520 kgf/cm².

What is claimed is:

1. A method for preparing solid polydodecanamide and copolymers based thereon comprising melting ω-dodecalactam or a mixture of ω-dodecalactam and polyamide-forming monomer copolymerizable therewith, filtering the resulting melt through a bed comprising solid oxidized particles of ω-dodecalactam having an elemental oxygen content of from 10 to 24% by weight and, polymerizing said melt at a temperature of 180° to 320° C. in contact with a polymerization catalyst for ω-dodecalactam.

2. The method according to claim 1 in which said solid oxidized particles of ω-dodecalactam are obtained by treating ω-dodecalactam with oxygen at a temperature of about 100° to 250° C.

3. The method according to claim 1 in which said solid oxidized particles of ω-dodecalactam are obtained by melting ω-dodecalactam at a temperature of about 153° to 250° C. and treating the molten ω-dodecalactam with air or a mixture of oxygen and nitrogen.

4. The method according to claim 1 in which said solid oxidized particles of ω-dodecalactam are obtained by treating ω-dodecalactam at a temperature of about 100° to 150° C. with a mixture of oxygen and nitrogen.

5. The method according to claim 1 in which solid polydecanamide is prepared.

6. The method according to claim 1 in which a solid copolymer of polydodecanamide and a polyamide forming monomer copolymerizable therewith is prepared.

7. The method of claims 1, 2, 3, 4, 5 or 6 in which said melt is polymerized in contact with a molecular weight regulator.

* * * * *